INVENTORS:
FRED E. LUBORSKY;
RAYMOND E. SKODA,
by John J. Kessane
THEIR ATTORNEY Sept. 12, 1972 F. E. LUBORSKY ET AL 3,691,032

PERMALLOY FILM PLATED WIRES HAVING SUPERIOR NONDESTRUCTIVE READ-OUT CHARACTERISTICS AND METHOD OF FORMING

Filed May 1, 1970 2 Sheets-Sheet 2

INVENTORS:
FRED E. LUBORSKY;
RAYMOND E. SKODA,
by John J. Kissane
THEIR ATTORNEY

United States Patent Office 3,691,032

Patented Sept. 12, 1972

3,691,032

PERMALLOY FILM PLATED WIRES HAVING SUPERIOR NONDESTRUCTIVE READ-OUT CHARACTERISTICS AND METHOD OF FORMING

Fred E. Luborsky, Schenectady, and Raymond E. Skoda, Scotia, N.Y., assignors to General Electric Company Filed May 1, 1970, Ser. No. 33,631
Int. Cl. H01f
U.S. Cl. 204—40 11 Claims

ABSTRACT OF THE DISCLOSURE

Nondestructive read-out characteristics of permalloy film coated wires for magnetic memories are significantly enhanced by selectively depositing fine grained islands of a face centered cubic metal, e.g., gold, along the nodular surface of a nonmagnetic substrate of preferably dissimilar metal, e.g., copper, prior to deposition of the permalloy film thereon.

This invention relates to permalloy film coated wires exhibiting superior nondestructive read-out characteristics and to a method for forming such films by depositing islands of a face centered cubic metal atop a surface roughened wire substrate prior to deposition of the permalloy film thereon.

In magnetic film plated wire memories wherein information is stored by switching the magnetic orientation at selected sites along a uniaxial oriented magnetic film, it often is desirable to nondestructively read-out stored information from the memory, i.e., detect the magnetic orientation of selected bit sites along the wire without destroying the magnetic orientation of the bit sites by an amount inhibiting subsequent read-out of the stored information. Typically, nondestructive read-out wire memories employ a zero magnetostriction permalloy film, e.g., a film of nickel-iron or a nickel-iron alloy containing less than 20% by weight of materials such as cobalt, copper, molybdenum, sulphur, or phosphorus, atop a resilient nonmagnetic wire substrate and the suitability of a particular wire for non-destructive read-out purposes can be determined by a measurement of criteria such as the wall motion coercive force and the read limit field utilizing techniques such as are described by H. Belson in an article published in the 1963 Proceedings Intermag Con. 12–4–1 and amplified by R. Girard et al. in IEEE Transactions on Magnetics, Vol. Mag–5, pp. 501–505, September 1969. The "read limit" parameter as used herein is the maximum word drive current allowing nondestructive read-out of the memory bit and varies directly with the "D" value described in the R. Girard et al. publication.

It also is desirable for the permalloy film of a wire memory to be thin to permit a high density of bits and to reduce the drive current required to read-out information from bit sites along the wire. Heretofore, superior nondestructive read-out characteristics in permalloy films have been obtained by use of wire substrates having a columnar surface to produce a nodular topography upon which the permalloy film is deposited. This substrate surface has proven to be satisfactory for permalloy films between 4000 and 10,000 A. thick. However, because the required drive current for read-out of stored information in a wire memory is directly proportional to the film thickness, reductions in film thickness are desirable to permit utilization of low cost integrated semiconductor drive circuits having limited output power.

It is therefore an object of this invention to provide a permalloy plated wire having superior nondestructive read-out characteristics for a given film thickness.

It is also an object of this invention to provide a nondestructive read-out permalloy plated wire memory wherein the permalloy film is significantly below 6000 A. in thickness.

It is a further object of this invention to provide a nondestructive read-out permalloy plated wire memory requiring reduced drive currents for operation.

It is still further object of this invention to provide a method of forming a magnetic film plated wire having superior nondestructive read-out characteristics for a given permalloy film thickness.

These and other objects of this invention generally are achieved by depositing islands of a face centered cubic metal over a surface roughened non-magnetic wire substrate prior to deposition of the permalloy film thereon. Thus a magnetic film plated wire having superior nondestructive read-out characteristics in accordance with this invention is characterized by a non-magnetic cylindrical substrate having a columnar surface structure producing a topography characterized by a plurality of nodular protrusions along the cylindrical substrate with a plurality of islands of a face centered cubic metal, e.g., gold, copper, etc., being deposited along the surface of the rough substrate to coat a portion thereof. The term "island" as used herein refers to the metallographically discontinuous topography characteristically produced during the initial stages of deposition wherein the deposited metal forms isolated regions coating less than about 95% of the underlying surface. To complete the wire memory, a zero magnetostriction permalloy film having a uniaxial anisotropy is deposited atop the island coated roughened wire substrate utilizing conventional techniques with superior nondestructive read-out characteristics in the permalloy film being produced by the topography of the underlying substrate. Preferably, the roughened substrate and islands are of dissimilar materials, e.g., copper and gold, and have grain sizes varying by at least a factor of five in contrast to homogeneous wire substrate surfaces heretofore employed for wire memories.

The novel features believed characteristic of the invention are set forth in the appended claims. The invention itself, together with further objects and advantages thereof, may best be understood by reference to the following description, taken in conjunction with the accompany drawings, in which:

Figure 1:
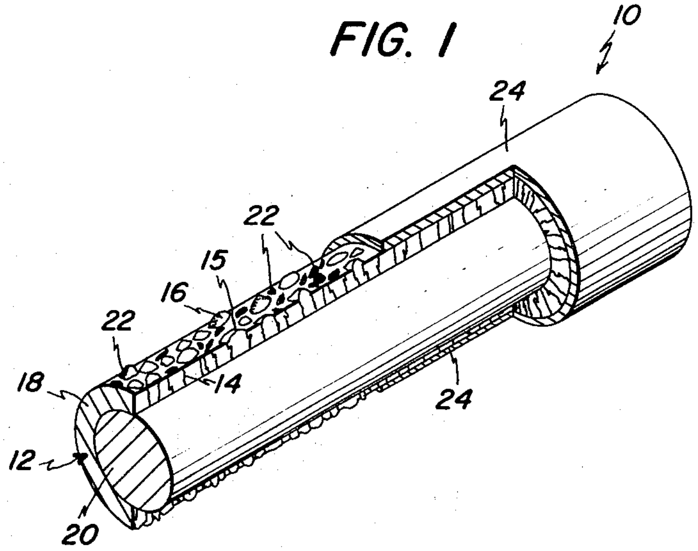
FIG. 1 is an enlarged isometric view illustrating in partial section a permalloy plated wire in accordance with this invention.

A permalloy plated wire 10 in accordance with this invention is illustrated in magnified form in FIG. 1 and generally comprises a nonmagnetic substrate 12 having a roughened surface topography inherently produced by a columnar structure, identified by reference numeral 14, at the periphery of the wire substrate. Typically, columnar structure 14 is a granular or polycrystalline growth having a single orientation extending in a radial direction and terminating in an arcuately contoured surface 15 to produce a plurality of nodular protrusions 16 along the surface of the wire substrate. Thus, columnar structure 14 as used herein would include grain structures often characterized as "fibrous" structures in metallurgical texts as well as the conventional columnar structures characteristically formed by a rapid large grain deposition in contradistinction to the laminar grain growth typically formed by the smooth deposition of small grain particles upon a substrate.

Because substrate 12 physically must be resilient and exhibit a high tensile strength while columnar depositions of various non-magnetic metals are known to be obtainable utilizing conventional metal plating baths by omitting the brightener and employing either a high plating current density, a high bath temperature, or a slight variation in the acidity or constituent salts of the bath, substrate 12 typically is formed by electrodepositing a rough gold, copper, lead, or silver plating 18 atop a resilient core 20, e.g., a core of beryllium copper, Phosphor bronze or gold clad tungsten, to produce nodular protrusions 16 desired for the substrate surface of the Permalloy film. While the amplitude and frequency of nodular protrusions 16 are best determined empirically for each desired magnetic film thickness (as will be more fully explained hereafter with reference to FIG. 4), nodular protrusions having an amplitude between 1500 A. and 15,000 A. tend to produce improved nondestructive read-out characteristics in Permalloy films having a thickness between approximately 2500 A. and 10,000 A. Desirably, the grain size of the non-magnetic substrate surface should be within a range between 500 A. and 1500 A. with optimum nondestructive read-out characteristics being obtained when plating 18 is deposited under conditions producing a surface grain size of approximately 1000 A. Surface topographies suitable for substrate 12 and the method of controlling topography parameters are outlined in an article by H. D. Richards et al. entitled "Topography Control of Plated Wire Memory Elements" published in the IEEE Transactions on Magnetics, vol. Mag–4, No. 3, September 1968.

To enhance the nondestructive read-out characteristics of the wire memory in accordance with this invention, islands 22 of a face centered cubic metal, e.g. copper, gold, silver, lead, etc., are deposited atop surface roughened substrate 12 to form metallographically discontinuous regions thereon. Desirably, the material chosen for islands 22 should differ from the roughened substrate surface accepting the deposition and the islands should be deposited under conditions producing a grain size in the islands substantially less than, e.g., 0.2 fold of, the grain size of the underlying substrate. In general, a grain size less than 100 A. is preferred for the islands.

The thickness of islands 22 must be less than the thickness at which adjacent regions of the deposited metal combine to coat 95% of the underlying substrate. While the maximum thickness of the islands therefore is varaible dependent upon the metal forming the islands, the islands normally are less than 300 A. thick with superior nondestructive read-out characteristics being obtained in permalloy films less than 4000 A. in thickness by the utilization of island structures less than 100 A. thick.

The island coated substrate is overlaid with a cylindrical permalloy film 24 having a thickness producing the desired nondestructive read-out characteristics for the film. In general, by the use of an island coated roughened wire substrate, permalloy films thinner than 7000 A., and as thin as 2200 A., have exhibited nondestructive read-out characteristics suitable for memory structures.

It is believed that the superior nondestructive read-out behavior of the Permalloy plated wire structure of this invention arises as a result of either high anisotropy or high dispersion regions in the deposited permalloy film, or a combination of both. The development of high anisotropy regions is based on the strong dependence of anisotropy with composition in the Ni-Fe permalloy film. High anisotropy regions will develop on and around surface irregularities because of composition fluctuations in the Ni-Fe permalloy film characteristically produced around irregularities, e.g., nodules protruding from the surface, during electroplating of the permalloy films. High anisotropy regions also will result by depositing on different substrates. Thus, the uniaxial composition fluctuation of Ni-Fe permalloy films is markedly different when depositing on substrates of different composition.

The development of regions of high and low dispersion is based on developing regions of different grain sizes in the pemalloy film. It is well known that large grain sizes produce large dispersions. Because the initial layers of the Ni-Fe permalloy film develop epitaxially on the substrate, these layers reflect the grain size and size variations of the substrate. Thus on a substrate with both large and small grain sizes, the initial layers of Ni-Fe will also have both large and small grain sizes, and therefore regions of different dispersions.

Figure 2:
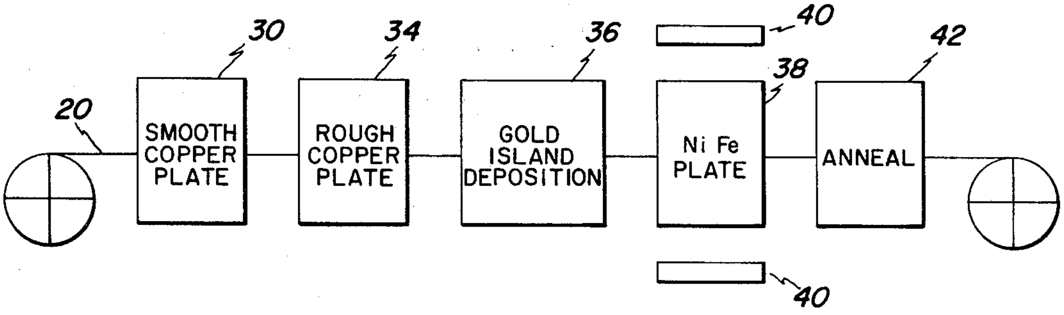
FIG. 2 is a flow chart illustrating in block diagram form a suitable technique for forming the permalloy plated wire illustrated in FIG. 1.

To form plated wire 10 utilizing the preferred technique specifically illustrated in FIG. 2, a cleaned resilient core 20, e.g., a 2 mil thick gold clad tungsten core commercially available from Dover Wire Works, Dover, Ohio, and fully described in copending U.S. patent application Ser. No. 658,942, filed Aug. 7, 1967, in the name of R. O. McCary et al. and assigned to the assignee of the present invention, is passed through a smooth copper plating bath 30, e.g., a bath typically containing 225 g./l. $CuSO_4 \cdot 5H_2O$, 32 g./l. $H_2SO_4$, 0.13 ml./l. HCl (con.) and 5.0 ml./l. of a suitable brightener such as a soluble polyether and an organic polysulfide to provide a smooth copper surface for the growth of a columnar structure thereon. Suitably, bath 30 is operated at approximately 24° C. and utilizes a plating current of approximately 90 milliamperes for a two-inch length of 2.2 mil diameter wire being drawn through the plating baths at a rate of approximately 21 inches/min. The smooth copper coated substrate then is passed through a rough copper plating bath 34 suitably consisting of 120 g./l. $CuSO_4 \cdot 5H_2O$ and 45 g./l. $H_2SO_4$ to produce a columnar structure atop the copper coated core with the amplitude and frequency of the nodular protrusions being varied by an alteration of the current density between 1 and 120 milliamperes for a two-inch length of wire in the bath. Typically, bath 34 is maintained at a temperature of 30° C. to 60° C. and is pumped at a rate of approximately 4 liters per minute to obtain uniform deposition characteristics along the thickness of the deposited layer.

Although an underlying smooth copper surface is desirable to produce greater uniformity in the growth of columnar structure 14 during plating in bath 34, the rough copper surface could be deposited directly atop gold clad tungsten core 20, if desired. Similarly, commercially available beryllium copper and phosphor bronze wire substrates can serve to accept direct depositon of a columnar surface thereon. Other suitable copper baths to produce a columnar deposition with nodular protrusions also are described in the heretofore cited H. D. Richards et al. article.

When it is desired that a gold columnar granule structure having a grain size in excess of 1000 A. be formed atop nonmagnetic core 20, a gold bath consisting of Technic HG (98.99% Au), i.e., a proprietary gold bath obtainable from Technic, Inc., Providence, R.I., can be utilized at a pH of 9.0, a bath temperature of 25° C. and a plating current between 3 and 5 milliamperes per square centimeter. Similarly, a lead columnar surface may be grown atop a copper core or gold clad tungsten core utilizing the fluorosilicate baths listed on page 289 of "Modern Electroplating" edited by Alan Gray and published by John Wiley & Son, 1953, by employing high deposition current densities and omitting the glue brightener from the baths. To deposit a rough silver plating atop core 20, a bath consisting essentially of equal parts by weight silver, free sodium cyanide, and sodium carbonate typically is suitable employing a high current density to effect a rapid deposition. In general, a columnar surface topography can be obtained in plating any metal from a conventional deposition bath without brighteners by adjusting such bath parameters as current density, acidity bath constituents, or bath temperature in accordance with well-known electrodeposition procedures.

Figure 3:
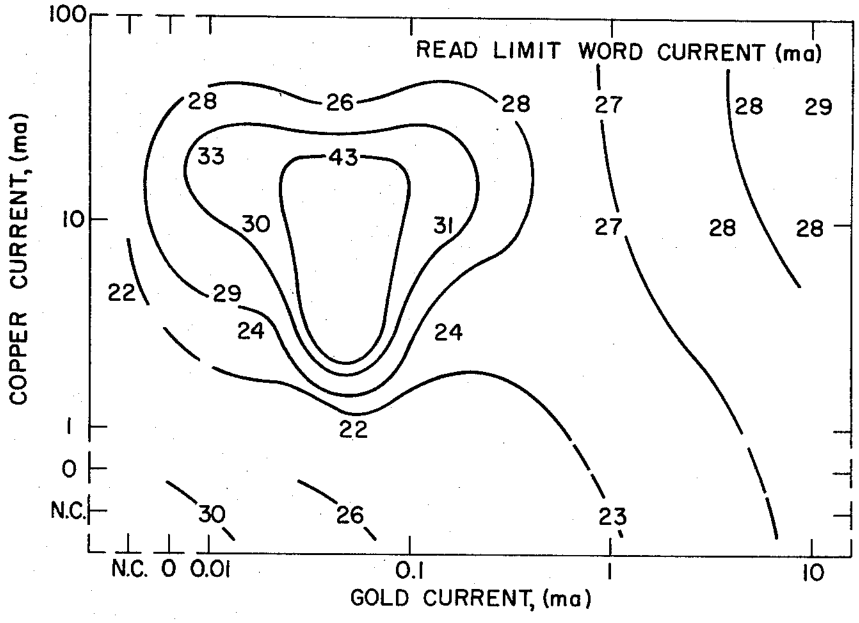
FIG. 3 is a graphical illustration portraying the variation in read limit word current for permalloy films plated atop diverse substrates; and, FIG. 4 is a graphical illustration portraying deposition conditions producing maximum read limit word current in permalloy films of diverse thicknesses.

After formation of a columnar copper surface atop wire core 20 within bath 34, the coated wire is passed into bath 36 wherein a face centered cubic metal, e.g., copper, gold, silver, lead, etc., is deposited as isolated islands preferably having a fine grain size relative to the grain size of the underlying columnar surface. For a surface roughened copper substrate, a gold bath suitably consisting of $KH_2PO_4$, $H_3PO_4$, $KAu(Cn)_2$ may be employed with deposition being conducted at relatively low current densities, e.g., 2 ma. per square centimeter. A particularly fine grain deposit of gold islands may be obtained from a bath consisting of Orosene 999 (a commercially available proprietary mixture from Technic, Inc.), 180 g./l. Orosene Make-up #1, 79 m./l. Orosene Make-Up #2, and 30 g./l. Orosene 999 gold salt with deposition being conducted at a temperature of 28° C., a pH of 4.3, a current density of 10 milliamperes for a 2 inch substrate being drawn through the bath at a rate of 21 inches/min. In general, the current density employed to deposit the gold islands varies dependent upon the substrate topography and the thickness of the magnetic film to be deposited thereon. For example, as can be seen from the graph for FIG. 3 illustrating in contour fashion the constant read limit word currents obtained from permalloy films deposited atop surface roughened copper substrates having gold islands deposited thereon, read limit word currents above 43 milliamperes are obtained for a 2700 A. thick nickel-iron film containing minor amounts of cobalt only with a gold deposition current density between approximately 0.02 and 0.1 milliampere for a 2.3 inch diameter wire substrate traversed through the 2 inch long gold bath at a rate of 21 inches per minute. When the gold island plating is increased, for example, to 1 milliampere, the read limit word current decreases to approximately 27 milliamperes while a decrease in the gold plating current density to 0.01 milliampere effects a reduction in the read limit word current of the permalloy film to approximately 29 milliamperes. It will also be noted from FIG. 3 that the read limit word currents also vary as a function of the current density employed for plating the columnar copper surface on the wire core with read limit word currents above 43 milliamperes only being obtainable utilizing a copper current density between approximately 2 and 20 milliamperes. Thus, both the current density employed to form the gold islands and the current density employed to form the columnar surface atop the resilient core are important in maximizing the read limit word currents of the permalloy film and these plating current densities are best determined empirically for various operating conditions. However, as can be seen from FIG. 3, peak read limit word currents are only obtained when the substrate is provided with a roughened surface and a partial layer of a face centered metal is deposited thereon. The wall motion coercive force of the permalloy films also was found to vary with the current densities employed for producing a roughened surface on the substrate and for depositing the fine grained islands of a face centered cubic metal thereon in a manner similar to the illustrated variation in read limit word currents with these parameters.

When it is desired to form fine grain islands 22 of a face centered cubic metal other than gold, any bath capable of depositing the metal in a grain size no greater than approximately 0.2 fold the grain size of the substrate can be employed. The islands, however, desirably also are of a different metal than the surface roughened substrate upon which the islands are deposited. For example, when substrate 12 has a gold columnar surface, islands of fine grain copper may be deposited atop the substrate, e.g., utilizing bath 30, to enhance the nondestructive read-out characteristics of the wire. Similarly, fine grain silver or lead can be deposited in island form utilizing the baths described on page 328 and pages 245 and 246, respectively, of Modern Electroplating by F. A. Lowenheim, 2nd edition, John Wiley, New York, 1963.

After deposition of fine grain islands 22 atop the substrate 14, the wire is passed into a permalloy bath 38 wherein a zero magnetostriction film of nickel-iron or an alloy of nickel-iron containing up to 20% by weight of a material such as cobalt, copper, sulphur, potassium, etc., is deposited atop the film to a thickness less than 10,000 A. As is well known in the art, the ratio of nickel to iron should be substantially 4:1 to obtain zero magnetostriction in the deposited permalloy film. One suitable bath for depositing zero magnetostriction permalloy film 24 is a bath consisting essentially of 143 g./l. $NiSO_4 \cdot 6H_2O$, 25 g./l. $H_3BO_3$, 39 g./l. $FeSO_4 \cdot 7H_2O$, 0.03 g./l. thiourea, 0.1 g./l. cobalt ions from a $CoSO_4$ solution, and sufficient $H_2SO_4$ to produce a pH of 2 in the bath. In general, the concentration of thiourea in the permalloy plating bath is a compromise between the low concentrations desired to obtain a high wall motion coercive force in the deposited permalloy film and the minimal thiourea concentrations required to inhibit reduction in the read limit of the film. A temperature between 30° and 60° C. suitably is employed during deposition dependent upon the desired thickness of the permalloy film and the current in the bath is varied between 7 milliamperes and 40 milliamperes dependent upon the bath temperature to produce a zero magnetostriction permalloy film atop the island coated substrate passing through permalloy bath. To provide a homogeneous film deposition, the bath is pumped, e.g., at a rate of 5.5 liters per minute, during deposition while a linear magnetic field generated by electromagnetic coils 40 disposed on opposite sides of the bath is rotated about the bath in accordance with the teachings of my copending U.S. patent application Ser. No. 748,507, filed July 29, 1968 and now U.S. Pat. No. 3,556,954 to produce a circumferential orientation in the deposited permalloy film. In general, any conventional nickel-iron or nickel-iron alloy plating bath, e.g., the bath described in the heretofore cited H. D. Richards et al. article, capable of producing a zero-magnetostriction film deposition, can be employed in the practice of this invention with superior nondestructive read-out characteristics in the permalloy film being produced by the unique substrate upon which the film is deposited. After deposition of permalloy film 24 to the desired thickness, permalloy plated wire 10 is passed through an annealing furnace 42 wherein the wire is annealed at a temperature of approximately 300° C. to thermally stabilize the permalloy film. In conventional fashion, current can be conducted through the wire during annealing to enhance the circumferential orientation of the permalloy film deposited thereon or to produce a circumferential orientation in the permalloy film when the film is deposited without an orienting magnetic field.

Figure 4:
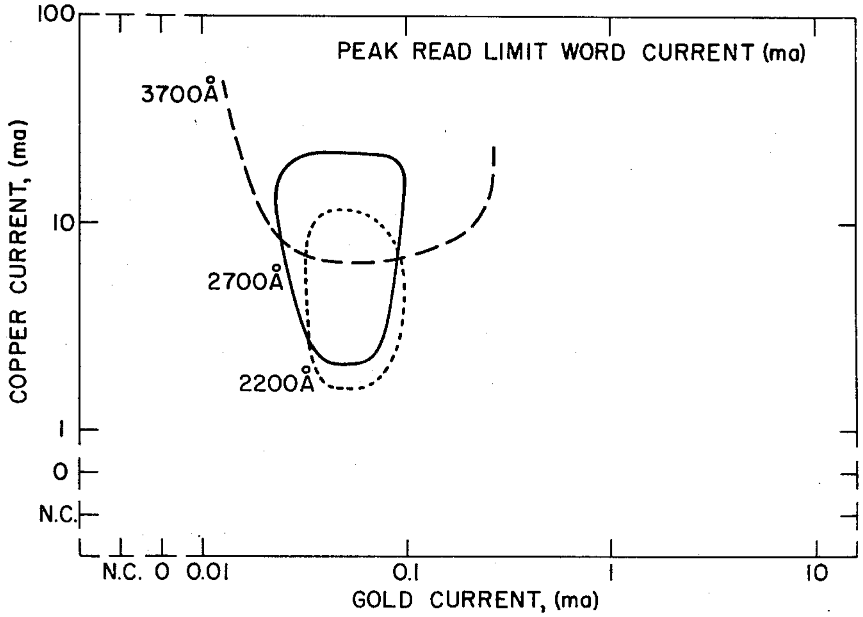

It will be noted from the contour curves of FIG. 4 depicting peak regions of read limit word current for permalloy films of various thicknesses deposited atop a columnar copper surface having islands of fine grained gold thereon, the copper and gold plating current ranges wherein maximum read limit word currents are obtained decreases with decreasing thickness of the permalloy film. Thus, while a permalloy film having a thickness of 3700 A. exhibits a peak read limit word current when deposited atop a copper substrate having gold islands formed by utilization of a plating current between 0.01 and 0.3 milliampere in gold bath 36 for a wire speed of 21 inches per minute, a 2200 A. thick permalloy film deposited under otherwise identical conditions requires a gold plating current within a reduced range from approximately 0.05 to 0.1 milliampere to obtain peak read limit word current in the permalloy film. Similarly, as the thickness of the permalloy film decreases, the range of current density employed to plate the copper columnar surface atop substrate 12 to obtain the maximum read limit word current in the permalloy film is reduced relative to the range required to produce maximum read limit word currents in thicker permalloy films. Thus, while a roughened surface is required for thin film permalloy deposition, the amplitude of the nodular protrusions produced by rapid deposition of copper on core 20 can be significantly reduced for thin permalloy films relative to the surface protrusions required to produce the peak read limit word currents in thicker permalloy films.

As will be appreciated from the increasing area of peak read limit word current regions with increasing permalloy film thickness illustrated in FIG. 4, the deposition range of both the large grain columnar surface on core 20 and fine grain face centered cubic islands 22 to produce maximum read limit word currents in the permalloy film is diminished as the thickness of the permalloy film is reduced below 2700 A. Moreover, because the columnar surface and isand deposition parameters are variabe dependent upon factors such as the ingredients in the nonmagnetic plating baths and the metals deposited therefrom, optimization of plating bath parameters best is determined empirically for each permalloy film process. The wall motion coercive forces of permalloy film deposited in accordance with this invention also were found to vary in a fashion substantially identical to the variation in read limit word currents with permalloy film thickness illustrated in FIG. 4.

The improvement in nondestructive read-out characteristics of permalloy plated films produced by the deposition of fine grain islands of a face centered cubic metal along the surface roughened substrate prior to permalloy film deposition was exemplified by comparing the read limit word fields of identical permalloy films deposited on various substrates. Measurement of read limit word fields was conducted in conventional fashion, i.e., utilizing techniques outlined in the heretofore mentioned publications of H. Belson and R. Girard et al. by sequentially disposing permalloy plated wires having different substrates within a glass tube having a 15-turn coil of 1 mil diameter wire wound along the periphery thereof. A 1-kHz. sine wave current then was passed down the permalloy plated wire to generate the easy access field and a pulse current having a rise time of approximately 10 nsec., a width of 50 nsec., an adjustable magnitude, and a repetition rate of 3.3 mHz. was applied to the 15-turn coil to provide the hard axis field. The signal sensed from the permalloy plated wire then was strobed at a fixed time position and displayed as a function of easy axis current to form a visual display loop wherein the read limit word current of the plated wires were determined by measuring the current at which the signal generated by the plated wire just starts to decrease from its saturation value at H=0. Utilizing such testing procedure, a 3700 A. thick nickel-iron-cobalt film containing 1.5% by weight cobalt deposited from bath 36 atop a smooth copper core having a metallurgically continuous gold coating thereon exhibited a read limit word field (calculated from the word read current) of 5.0 oersteds while a read limit word field of 5.1 oersteds was obtained by direct deposition of the identical permalloy film on the smooth copper core without a gold coating. When the permalloy film was deposited under identical conditions atop a core having a columnar copper surface overlaid with a metallurgically continuous gold film, the read limit word field measured 4.9 oersteds while an increase in read limit word field of the permalloy film to 5.9 oersteds was obtained by direct deposition of the film atop the columnar copper surface without an intermediate continuous gold coating. However, when islands of gold less than 100 A. thick were deposited atop an identically formed columnar copper surface utilizing a current density of 0.05 milliampere for the composition of bath 34, the read limit word field of the deposited permalloy film increased to a value greater than 10 oersteds. The same gold island structure on a smooth copper substrate gave a read limit word field of only 4.7 oersteds.

Similar results also were obtained when 3800 A. thick films of nickel-iron-cobalt were deposited atop various wire substrates utilizing a plating bath identical to plating bath 36 with three-fold the cobalt ion concentrated therein. This produced NiFeCo films with 5.2% by weight cobalt. More specifically, read limit word fields below 6.0 oersteds were produced in permalloy films deposited atop a smooth copper substrate having a metallurgically continuous gold coating thereon, a smooth copper substrate having no coating thereon, a columnar copper substrate and a columnar copper substrate having a metallurgically continuous gold coating thereon. However, when the columnar copper substrate has islands of gold formed thereon in accordance with this invention by passing the substrate through bath 34 either without any plating current (i.e., wherein the gold islands are formed by molecular displacement of the copper substrate) or with a low, i.e., 0.05 ma., plating current, the read limit word field of the permalloy film deposited thereon increased to a level greater than 10 oersteds.

What we claim as new and desire to secure by Letters Patent of the United States is:

1. A magnetic film plated wire having superior nondestructive read-out characteristics comprising:

a non-magnetic, metallic, cylindrical substrate having a columnar surface structure producing a topography characterized by a plurality of nodular protrusions disposed along said cylindrical substrate, islands of a nonmagnetic face centered cubic metal, selected from the group consisting of gold, silver, copper, and lead, disposed atop the columnar surface of said cylindrical substrate to coat less than 95% of said substrate surface, wherein said cylindrical substrate is characterized by a surface grain size at least five-fold the grain size of the metal forming said islands, and a zero magnetostriction permalloy film, having a uniaxial anisotropy and a thickness of less than 10,000 A., deposited atop said island coated substrate.

2. A magnetic film plated wire according to claim 1 wherein said substrate is a different metal selected from said group.

3. A magnetic film plated wire according to claim 2 wherein said substrate is characterized by nodular protrusions having an amplitude of at least 1500 A. and a grain size at least five-fold the grain size of the metal forming the islands atop said substrate.

4. A magnetic film plated wire according to claim 2 wherein said substrate and said islands are formed of diverse metals selected from the group consisting of copper and gold.

5. A magnetic film plated wire according to claim 4 wherein said substrate is copper and said islands are gold, said gold islands being characterized by a thickness less than 300 A. and a grain size less than 100 A.

6. A magnetic film plated wire according to claim 5 wherein said nodular protrusions have an amplitude between 1500 A. and 15,000 A.

7. A magnetic film plated wire having superior nondestructive read-out characteristics comprising:

a nonmagnetic, metallic, resilient cylindrical substrate having a columnar surface structure producing a topography characterized by a plurality of nodular protrusions, islands of a nonmagnetic face centered cubic metal disposed atop said columnar surface at a plurality of locations along the length of said substrate, said islands being less than 300 A. thick and characterized by a grain size less than 0.2 fold the grain size of said underlying substrate, and a permalloy film deposited atop said island coated substrate in a thickness less than 10,000 A., said permalloy film contacting both said cylindrical substrate and said face centered cubic metal islands.

8. A magnetic film plated wire according to claim 7 wherein said cylindrical substrate is copper having a grain size in excess of 500 A. and said islands are gold with a grain size below 100 A.

9. A method of producing a magnetic film plated wire having superior nondestructive read-out characteristics comprising electrodepositing a columnar structure atop a nonmagnetic cylindrical, metallic, substrate to provide a plurality of nodular protrusions disposed along said substrate, electrodepositing islands of a face centered cubic metal at a plurality of dispersed locations along the surface of said substrate to coat a portion of said exposed wire substrate and electrodepositing a zero magnetostriction permalloy film having a uniaxial anisotropy atop said island coated substrate.

10. A method of producing a magnetic film plated wire according to claim 9 wherein said substrate is copper and said islands are gold having a grain size less than one-fifth the grain size of said underlying copper substrate.

11. A method of producing a magnetic film plated wire according to claim 10 wherein said copper is electrodeposited at a rate to produce nodular protrusions having an amplitude in excess of 1500 A. and said gold is deposited to a thickness less than 300 A.

References Cited

UNITED STATES PATENTS

| | | | |
|---|---|---|---|
| 3,411,892 | 11/1968 | Sasaki et al. | 340—174 PW |
| 3,327,297 | 6/1967 | Croll | 117—239 X |
| 3,543,250 | 11/1970 | Messner | 340—174 PW |
| 3,223,986 | 12/1965 | Clark | 340—174 PW |
| 3,371,326 | 6/1968 | Fedde | 340—174 PW |
| 3,354,447 | 11/1967 | Oshima | 340—174 PW |
| 3,525,023 | 8/1970 | Pollack | 117—239 |
| 3,492,158 | 1/1970 | Scow et al. | 117—239 |

OTHER REFERENCES

Phillips et al.: pp. 345–350, IEEE Transactions on Magnetics, vol. Mag–4, No. 3, September 1968.

MURRAY KATZ, Primary Examiner

B. D. PIANALTO, Assistant Examiner

U.S. Cl. X.R.

29—196, 199; 117—231, 239, 240; 204—43; 340—174 PW